Patented Dec. 2, 1952

2,620,312

UNITED STATES PATENT OFFICE 2,620,312

PROCESS OF MAKING A BITUMINOUS EMULSION

Donald N. Manzer, near Walnut Creek, Calif., assignor, by mesne assignments, to American Bitumuls & Asphalt Company, San Francisco, Calif., a corporation of Delaware No Drawing. Application September 25, 1950, Serial No. 186,669

6 Claims. (Cl. 252—311.5)

This invention relates to the manufacture of bituminous emulsions.

More particularly, this invention relates to the manufacture of an emulsion containing additives, desirably present in the emulsion, but which said additives, if incorporated therein according to common practices, have a marked tendency either to break the emulsion, in whole or in part, or substantially to reduce its stability.

By way of illustration, it is known that when road aggregates are coated with asphalt-in-water type road emulsions, the dried asphalt film formed on the aggregates is often stripped from the aggregates by water action. This stripping action can be prevented by incorporating in the emulsion various additives which insure a firm asphalt-aggregate bond in spite of the stripping properties of the water.

For instance, one additive which is very effective to avoid the stripping from the aggregate of the deposited asphalt film is sodium dichromate.

However, such use of sodium dichromate poses a certain serious difficulty. Asphalt-in-water road emulsions are frequently of the quick-setting variety (ASTM D401) and must have a high demulsibility (ASTM D244) and are accordingly very sensitive to electrolytes, foreign matter and the like. The direct addition of useful amounts of sodium dichromate to such emulsions causes them to break or seriously impairs their stability in storage.

The problem of incorporating sodium dichromate in quick-breaking emulsions has been attacked from many angles, such as by using larger amounts of emulsifying and/or stabilizing agents. This approach has the disadvantage of being costly, or converting the quick-setting emulsion to medium setting emulsion (ASTM D399) or slow setting emulsions (ASTM D631) or in some instances exceeding the allowable non-asphaltic content of the asphaltic residue.

Also, without success, it has been attempted to overcome the difficulty by numerous variations in the procedure of emulsification, such as by passing three streams to the emulsifying apparatus; namely, liquid asphalt, alkaline water and an aqueous solution of sodium dichromate.

Now I have discovered a method whereby additives of normal emulsion-breaking properties may be safely and easily incorporated in emulsions, without damaging said emulsions and without rendering them unstable in storage.

My process can be illustrated, as above, in reference to the manufacture of asphalt-in-water road emulsions containing sodium dichromate.

According to my process I have found that sodium dichromate may satisfactorily be incorporated into a conventionally prepared oil-in-water type emulsion, such as a quick-breaking asphalt-in-water emulsion, by the mixing therewith of a water-in-oil emulsion, containing sodium dichromate, in such quantity as to incorporate the desired amount of sodium dichromate in the oil-in-water emulsion. I have found that the bringing together of the oil-in-water emulsion and the sodium dichromate incorporated in a water-in-oil emulsion results in a finished emulsion which tolerates the presence of the sodium dichromate.

One way of proceeding in accordance with my process, as applied, for example, to asphalt quick-breaking emulsions, is to prepare a quick-breaking asphalt-in-water emulsion by conventional methods, such as by the process of Montgomerie U. S. Patent No. 1,643,675, according to which, asphalt is emulsified in an aqueous alkaline solution, the asphalt being the discontinuous phase, and the water the outer, continuous phase. To this emulsion there is added with agitation a water-in-oil asphalt emulsion, prepared in conventional manner, for example, by the emulsification of an aqueous solution of sodium dichromate into the asphalt, whereby the aqueous dichromate solution is the inner, discontinuous phase, and the asphalt, the outer, continuous phase. As will hereinafter more fully appear, the inner phase of the oil-in-water emulsion and the outer phase of the water-in-oil emulsion may be the same or different but compatible materials, for example, asphalt as the dispersed phase of the oil-in-water emulsion, and fuel oil as the continuous phase in the water-in-oil emulsion.

Thus, I have found that while salts, such as sodium dichromate or other alkali or acidic materials when incorporated in sensitive emulsions, such as quick-breaking asphalt emulsions, have a tendency to break the emulsion or to cause shot formation, by the process of the invention they may be added with no damage to the emulsion either immediately or during storage of the emulsion.

The successful incorporation into emulsions of otherwise damaging materials by my process is brought about by the prevention or absence of a high local concentration of the deleterious material, which is responsible for the breakdown of the emulsion. In other words, when the water-in-oil emulsion is added to the oil-in-water emulsion, the damaging material, e. g., sodium dichromate solution, is not immediately available to build up a high local concentration of emulsion-breaking agent, it being dispersed as minute droplets within a protective envelope of oil and is therefore rendered immiscible with the aqueous phase of the prime emulsion, e. g., the oil-in-water emulsion. The added water-in-oil emulsion is only gradually converted to oil-in-water emulsion, with the result that a high local concentration of the otherwise intolerable agent never builds up.

In general, the invention is applicable to the addition to oil-in-water emulsions of material which is dispersible in water, that is, to form true solutions or mere suspensions, which material is added directly to the emulsion would damage the same. Preferably contemplated by the invention, however, are water-soluble salts.

Accordingly, in addition to the salts of oxyacids of chromium, herein represented by sodium dichromate, other materials which would normally injure emulsions if directly incorporated therein are contemplated by the invention. In general, these materials are metal salts of inorganic acids, metal salts of organic acids, organic acids, inorganic acids, metallo-organic compounds, such as metal alcoholates, organic esters of inorganic acids, inorganic salts of organic bases, organic esters. Additional classes of materials as well as specific examples of various materials falling within the broad classes are set forth in U. S. Patent No. 2,396,669, hereby made a part hereof, according to which such materials are alleged to modify desirably the properties of bituminous materials.

As adhesion-promoting agents, in addition to the alkali metal and ammonium dichromates of U. S. Patent No. 2,412,526, there may be mentioned the water-soluble heavy metal salts of U. S. Patent No. 2,313,759, for example, antimony chloride, ferric oxalate, lead acetate, silver nitrate, cobalt chloride, ferric chloride, tin chloride, ferrous chloride, aluminum chloride, zinc chloride, ferric sulfate, etc.; the lead soaps, e. g., lead oleate, of U. S. Patent No. 2,243,409; the phosphorus, antimony and arsenic halides of U. S. Patent No. 2,276,436; the lead salts, such as lead acetate and lead nitrate of U. S. Patents No. 2,283,937 and 2,312,674; the quaternary ammonium compounds, such as benzyl trimethyl chloride of U. S. Patent No. 2,314,111. Additional examples are the quaternary ammonium compounds and amine salts disclosed in U. S. Patent No. 2,191,295.

Other examples of adhesion-promoting agents which may be employed in connection with the invention are those agents which have been proposed for treatment of the aggregate, followed by the coating with the bituminous substance, rather than for pretreatment of the bituminous substance, prior to the coating of the aggregate. Such agents are, for example, the water-soluble salts of the metals of silver, copper, aluminum, and iron disclosed in French Patent No. 837,974. Other agents suggested for treatment of the aggregate are disclosed in U. S. Patent No. 2,192,284, British Patent No. 469,202, U. S. Patent No. 2,177,568, etc.

In the preparation of the secondary water-in-oil emulsion for addition to the basic or primary oil-in-water emulsion, the continuous phase can be material of the same type employed for the discontinuous phase of the oil-in-water emulsion, for example, asphalt in both instances. However, in place of asphalt in the water-in-oil emulsion other bituminous material can be used which is capable of being formed into a water-in-oil emulsion and which is compatible with the asphalt or bitumen of the basic emulsion. By compatibility of the two bitumens employed in the two emulsions it is meant that the two bitumens are miscible or can be blended together to form a homogeneous mixture, with the result that the finished emulsion containing the two types of bitumens is capable of depositing a homogeneous, continuous film on aggregate. Thus, in order to determine the suitability of any two bitumens, the two bitumens may, prior to the formation of the emulsions, be evaluated for ease of miscibility, employing heat if necessary, and the resulting blend mixed with aggregate for the determination of the nature of the bituminous film that can be deposited on the aggregate, a homogeneous, continuous coating of the aggregate indicating that the two bitumens are satisfactory.

Preferably, the bitumen employed in the preparation of the water-in-oil emulsion is one having a lower viscosity than that of the bitumen employed in the primary oil-in-water emulsion. For example, while SC-6 asphalt may be used in both emulsions, it is preferred to employ an asphalt of SC-0 up to SC-6 in the water-in-oil emulsion and SC-6 asphalt in the oil-in-water emulsion. Similar combinations of high viscosity asphalt in the oil-in-water emulsion with lower viscosity asphalt in the water-in-oil emulsion may be made with the so-called MC (medium curing) and RC (rapid curing) asphalts. A preferred embodiment of the invention is an oil-in-water type emulsion of an asphalt having a penetration of about 150–300, preferably 150–200, at 77° F. mixed with a water-in-oil type emulsion of fuel oil having an API gravity between about 9 and 40, preferably between about 14 and 28, the said water-in-oil emulsion containing the additive desired to be incorporated in the oil-in-water type emulsion, and added to the oil-in-water emulsion in a quantity calculated to give the desired amount of additive in the oil-in-water emulsion.

The amount of water-in-oil emulsion to be added to the oil-in-water emulsion will of course vary depending on the amount of additive contained in the water-in-oil emulsion and the amount desired for incorporation in the basic emulsion. Thus, for purposes of providing the basic emulsion with an adhesion-promoting agent, an amount of water-in-oil emulsion is added to the basic emulsion so as to furnish the latter with about 0.1 to 5%, preferably about 0.5% to 1% by weight of the finished emulsion of the desired adhesion-promoting agent.

While the invention has its chief utility in connection with oil-in-water type emulsions of the quick-breaking type, which are inherently quite sensitive to the addition of foreign agents, other relatively more stable emulsions, such as the medium- and slow-setting emulsions, can often be treated advantageously in accordance with the invention.

The basic oil-in-water emulsion is prepared from a water-insoluble, water-dispersible, organic thermoplastic bituminous substance, normally solid, semi-solid or a viscous liquid at ordinary atmospheric temperatures. These materials are bitumens, such as petroleum and native asphalts, native mineral waxes, asphaltites; pyrobitumens, such as asphaltic pyrobituminous shales, lignite, peat; pyrogeneous distillates, such as petroleum paraffin, peat paraffin, oil-gas tar, coal tar; pyrogeneous residues, such as blown petroleum asphalts, sludge asphalts, pressure tars, residual oils, oil-gas-tar pitch, wood pitch, etc. Of these materials petroleum asphalt is most advantageously used, and it may be produced by steam refining, by air-blowing, by solvent extraction methods, or by a combination of such methods.

The water-in-oil emulsion may be prepared in conventional manner by the emulsification of an aqueous solution or suspension of the desired additive into any or a mixture of the foregoing bituminous substances compatible with the bituminous substance employed in the preparation of the oil-in-water emulsion.

In the preferred embodiment of the invention preformed water-in-oil emulsion containing the additive desired to be incorporated in the oil-in-water emulsion is added in the desired amount to a preformed oil-in-water emulsion with agitation. If desired, the water-in-oil emulsion may be incorporated in the oil-in-water emulsion as a third stream, passed to the emulsifying apparatus, for example, a colloid mill, in addition to the separate streams of bitumen and alkaline water employed in the preparation of the oil-in-water emulsion.

As hereinbefore pointed out, it is now possible by the present invention to prepare a bituminous emulsion containing additives which heretofore have caused the emulsion to break into coarse particles or lumps (shot formation), to yield a non-homogeneous emulsion. A test employed in determining the homogeneity of the emulsion, and the one utilized to obtain the data hereinbelow appearing is the so-called "sieve test," described, for example, in ASTM D244-42.

According to this test, a previously weighed No. 20 sieve, having a 3-inch frame of the U. S. Standard Sieve Series, is first wet with a 2% sodium oleate solution, after which there is poured therethrough exactly 1000 g. of the emulsified asphalt. The container and residue on the sieve are then washed thoroughly with the sodium oleate solution until the washings run clear. A previously weighed tin box cover or shallow metal pan of appropriate size to fit over the bottom of the sieve is placed under the sieve and heated for 2 hours in a drying oven whose interior temperature is 220° F., then cooled in a desiccator and weighed. The total weight of the sieve, pan and residue in grams, less the combined tare weight of the sieve and pan, is the weight of the residue by the sieve test. The percentage of residue in the emulsion is calculated on the basis of this weight. Ordinarily, a satisfactory emulsion will have a sieve test value of not more than 0.10 per cent.

As an illustrative example of the practice of the invention, the following is given:

(a) An emulsion of 200/300 penetration California asphalt in alkaline water was produced by the process of Montgomerie United States Patent No. 1,643,675, in which the asphalt is in the internal phase and the external phase is an aqueous alkaline solution.

(b) About 40 per cent of a 50 per cent aqueous sodium dichromate solution was mixed by agitation into 60 per cent of 18° API fuel oil to form a water-in-oil emulsion.

(c) To the emulsion prepared in (a) there was added the secondary emulsion prepared in (b).

The proportions in per cent by weight of ingredients in the final emulsion were as follows:

| Final Emulsion | Percent |
| --- | --- |
| 200/300 California Asphalt | 56.000 |
| Sodium Hydroxide | 0.125 |
| Water | 41.875 |
| Secondary Emulsion (from (b)) | 2.000 |
|  | 100.000 |

The final emulsion passed the sieve test and showed good adhesion for hydrophilic aggregate.

As a further illustrative example of the invention, a quick-breaking oil-in-water type emulsion of 180/200 penetration Venezuelan asphalt was prepared employing the following ingredients in the indicated proportions by weight per cent:

| | |
| --- | --- |
| Asphalt | 56.00 |
| Potassium hydroxide | 0.14 |
| Bentonite | 0.35 |
| Water | 43.51 |
| | 100.00 |

To portions of the foregoing emulsion there was added in varying amounts a water-in-oil emulsion prepared with the following ingredients in the indicated proportions by weight per cent:

| | |
| --- | --- |
| 18° API fuel oil | 60 |
| Sodium dichromate | 20 |
| Water | 20 |

The amounts, by weight per cent, of sodium dichromate added to portions of the primary emulsion, together with test results of the finished emulsions were as follows:

| | A | B | C |
| --- | --- | --- | --- |
| Sodium Dichromate | 0.2 | 0.3 | 0.0 |
| Residue | 56.6 | 56.6 | 56.6 |
| Demulsibility (.02 N CaCl₂) | 98.7 | 98.6 | 99.2 |
| Sieve, 20 Mesh | 0.030 | 0.040 | 0.025 |
| pH | 11.4 | 11.3 | 12.2 |
| Adhesion | 75 | 75 | 5 |

The tests for residue and demulsibility above indicated were run in accordance with ASTM D244-42 specifications, while the sieve test was the same as the one hereinabove described.

The adhesion test was carried out as follows: 200 g. of dry Standard Massachusetts rhyolite, graded so as to pass entirely through a ¼-inch (No. 3) sieve and to be retained completely on a No. 10 sieve was heated to 300° F. and mixed with 16 g. of emulsion until complete coating resulted. Three 50 g. samples of the coated aggregate were then each spread thinly on a metal can lid and left in an oven for 48 hours at 140° F. Each cured sample was then dropped into 400 cc. of boiling distilled water in a 600 cc. beaker and stirred three minutes at the rate of 60 times a minute, boiling meanwhile being continued. Each beaker was then removed from the heat and, after ebullition had ceased, cold water was run into the beaker through a submerged hose until any film of asphalt on the surface of the water was flushed out. Each sample of aggregate was then removed and placed on absorbent paper and air dried. The dried samples were then inspected visually by an experienced observer to estimate the percentage area coated, uncoated area being deemed that retaining no asphaltic coating. The figures for the three samples were then averaged.

Another example is as follows: An oil-in-water type quick-breaking emulsion was prepared employing the following ingredients in the indicated amounts by weight per cent

| | |
| --- | --- |
| 200/300 Penetration asphalt | 56.00 |
| Sodium hydroxide | 0.15 |
| Bentonite | 0.35 |
| Water | 43.50 |

To 96.7 parts of the foregoing emulsion was added 3.3 parts of an emulsion of the water-in-oil type made from 18° API fuel oil, a water solution of ammonium sulfate, and aluminum stearate, amounts by weight per cent being as follows:

| | |
|---|---|
| 18° API fuel oil | 54.5 |
| Aluminum stearate | 0.9 |
| Ammonium sulfate | 8.2 |
| Water | 36.4 |

The finished emulsion analyzed as follows:

| | |
|---|---|
| Residue | 55.6 |
| Demulsibility (.02 N CaCl$_2$) | 100. |
| Sieve, 20 mesh | 0.010 |
| Adhesion | 90. |

Obviously, many modifications and variations of the invention as hereinabove set forth may be made without departing from the spirit and scope thereof, and therefore only such limitations are to be imposed as are indicated in the appended claims.

I claim:

1. In the process of incorporating in an oil-in-water type emulsion having water as its continuous phase and a bitumen as its discontinuous phase, an additive which upon incorporation therein tends to break said emulsion, the improvement comprising the step of mixing with said oil-in-water emulsion a water-in-oil type emulsion having a water dispersion of said additive as the discontinuous phase and a continuous phase compatible with the discontinuous phase of said oil-in-water emulsion.

2. The improvement substantially as described in claim 1, wherein the oil-in-water type emulsion is an asphaltic emulsion of the oil-in-water type.

3. The improvement substantially as described in claim 2, wherein the continuous phase of the water-in-oil type emulsion is fuel oil.

4. The improvement substantially as described in claim 1, wherein the continuous phase of the oil-in-water type emulsion and the discontinuous phase of the water-in-oil type emulsion are both bitumens.

5. The improvement substantially as described in claim 4, wherein the bitumens are asphalt.

6. The improvement substantially as described in claim 5, wherein the asphalt of the oil-in-water type emulsion has a higher viscosity than that of the water-in-oil type emulsion.

DONALD N. MANZER.

REFERENCES CITED

The following references are of record in the file of this patent:

UNITED STATES PATENTS

| Number | Name | Date |
|---|---|---|
| 1,733,497 | Kirschbraun | Oct. 29, 1929 |
| 1,988,879 | Steininger | Jan. 22, 1935 |
| 2,412,526 | McCoy | Dec. 10, 1946 |
| 2,412,545 | Watts | Dec. 10, 1946 |

FOREIGN PATENTS

| Number | Country | Date |
|---|---|---|
| 23,538 | Australia | 1929 |
| 341,443 | Great Britain | Jan. 9, 1931 |